United States Patent [19]

Williams

[11] Patent Number: 4,522,338

[45] Date of Patent: Jun. 11, 1985

[54] IRRIGATION SYSTEM

[76] Inventor: Christopher G. Williams, 1106 E. 5th, Spokane, Wash. 99202

[21] Appl. No.: 454,549

[22] Filed: Dec. 30, 1982

[51] Int. Cl.³ ............................................. A01G 25/09
[52] U.S. Cl. .................................. 239/177.2; 239/183
[58] Field of Search ................ 239/180, 185, 191, 183, 239/184, 711, DIG. 1, 177.2

[56] References Cited

U.S. PATENT DOCUMENTS

| | | | |
|---|---|---|---|
| 2,097,452 | 11/1937 | Dearborn | 239/177.1 |
| 3,444,941 | 6/1966 | Purtell | 239/711 X |
| 3,507,336 | 4/1970 | Nelson | 172/438 |
| 3,519,206 | 7/1970 | Leaders | 239/711 |
| 3,687,372 | 8/1972 | Badcock | 239/183 |
| 3,902,668 | 9/1975 | Daugherty et al. | 239/177.1 |
| 3,942,722 | 3/1976 | Ebe | 239/180 X |
| 4,119,272 | 10/1978 | Tidwell | 239/178 |
| 4,146,049 | 3/1979 | Kruse et al. | 137/899 |
| 4,161,292 | 7/1979 | Holloway et al. | 239/DIG. 1 |
| 4,186,880 | 2/1980 | Jacobi et al. | 239/DIG. 1 X |
| 4,230,272 | 10/1980 | Snell | 239/121 |
| 4,230,275 | 10/1980 | Tidwell | 239/184 |
| 4,266,724 | 5/1981 | DiPalma | 239/195 |

FOREIGN PATENT DOCUMENTS

| | | | |
|---|---|---|---|
| 7502413 | 9/1975 | Netherlands | 239/183 |
| 2026293 | 2/1980 | United Kingdom | 239/183 |

Primary Examiner—Andres Kashnikow
Assistant Examiner—Kevin Patrick Weldon
Attorney, Agent, or Firm—Wells, St. John & Roberts

[57] ABSTRACT

A self-propelled irrigation system that is fully automated to irrigate regular and irregular shapes of land. The system includes a self powered cart and hose connection system by which access is made to various points along the length of a water supply main. The cart is powered to move along a prescribed path defined by a ground mounted electrical conductor wire. The cart will follow the path defined by the wire and perform various functions at points along the length of the conductor as initiated by signal emitters located along the path. Throughout the irrigation sequence, hose connection and disconnection, the entire hose length is kept suspended above the ground surface as not to interfere with the adjacent crop. Several sprinklers on the cart frame are independently controlled to produce an even application of water over the prescribed ground area. This is done by selectively varying the rotational speed of the sprinklers. Corners of selected areas are irrigated by a sprinkler head having a pressure control valve to vary the water throw distance.

21 Claims, 10 Drawing Figures

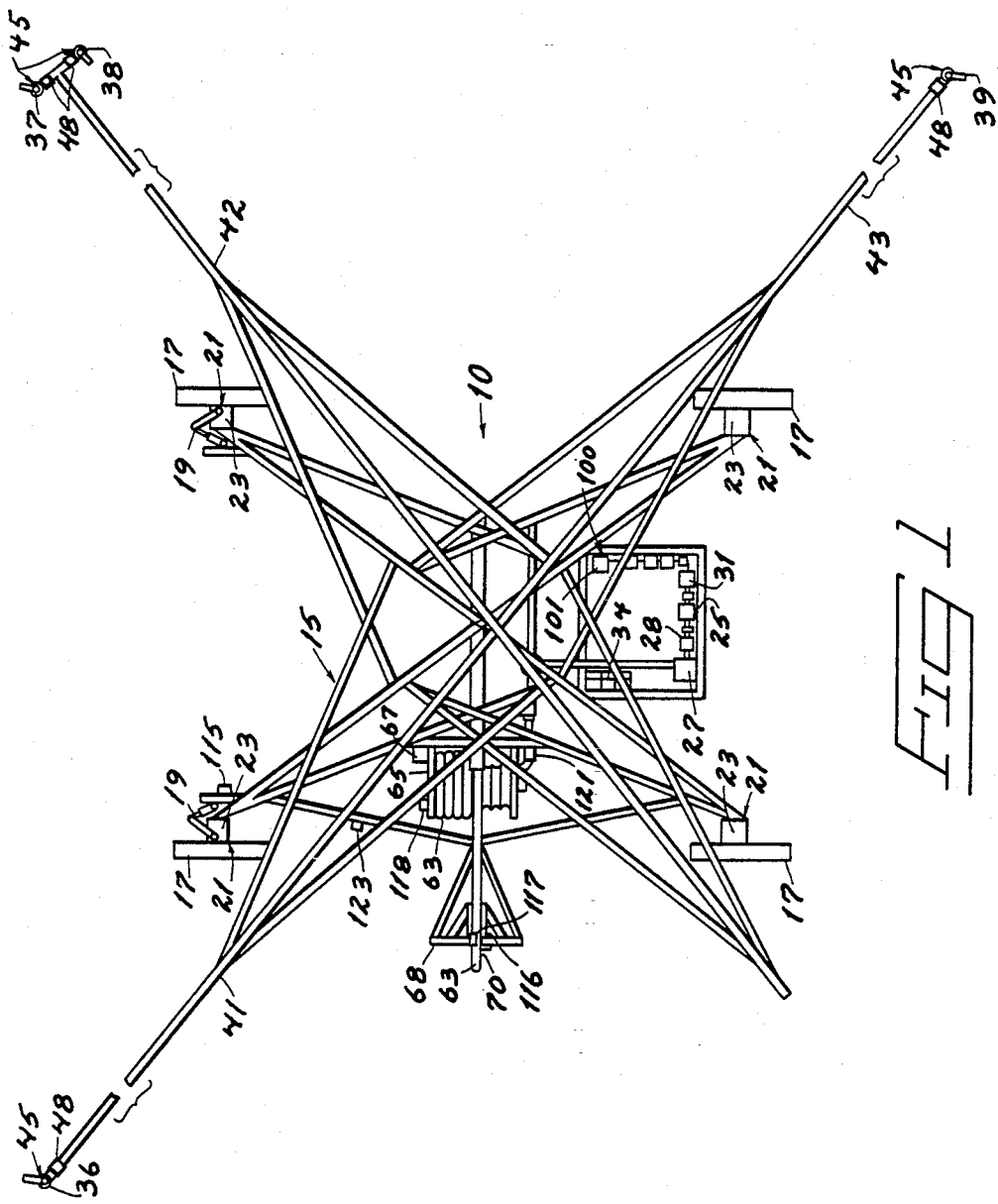

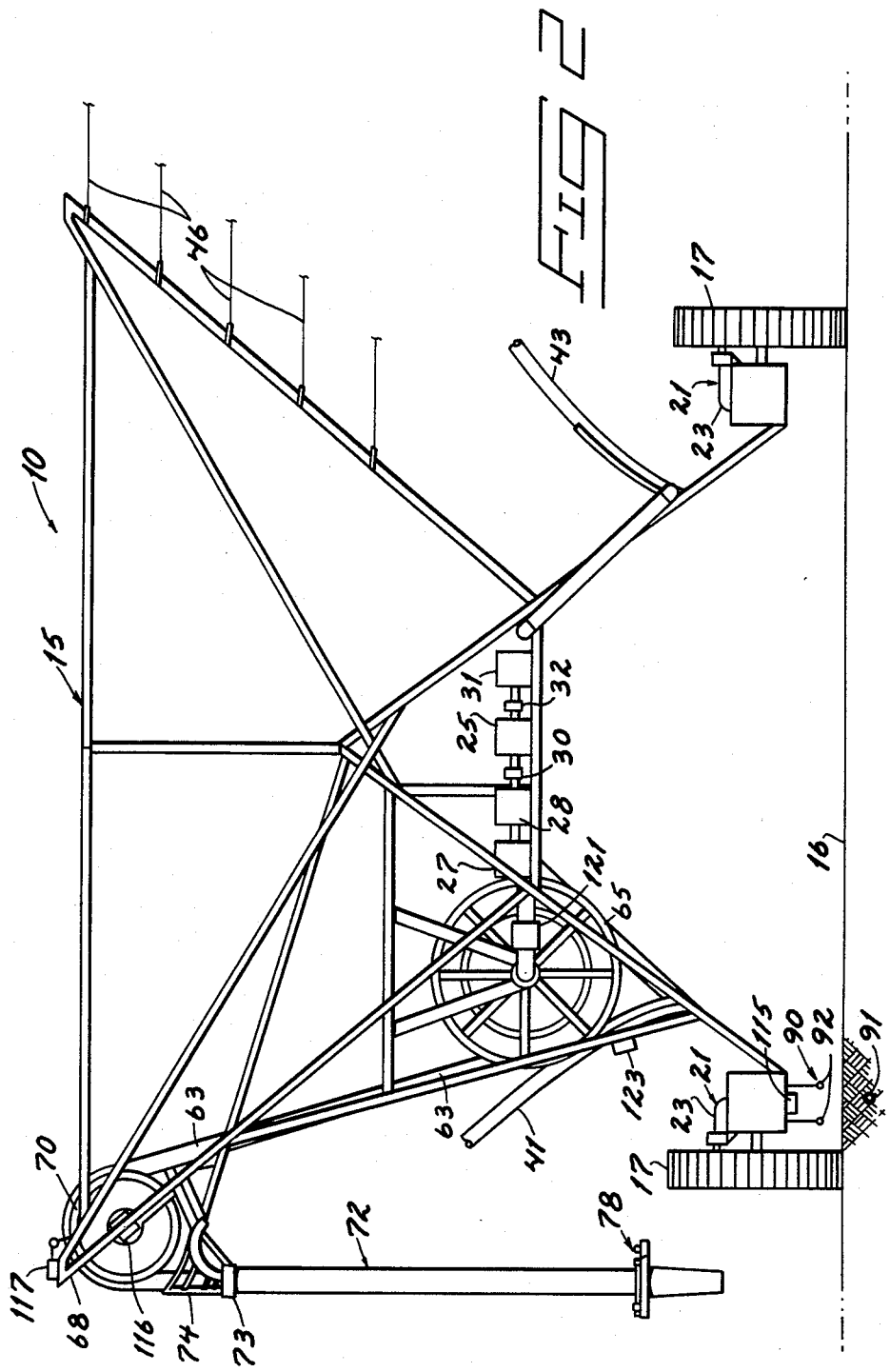

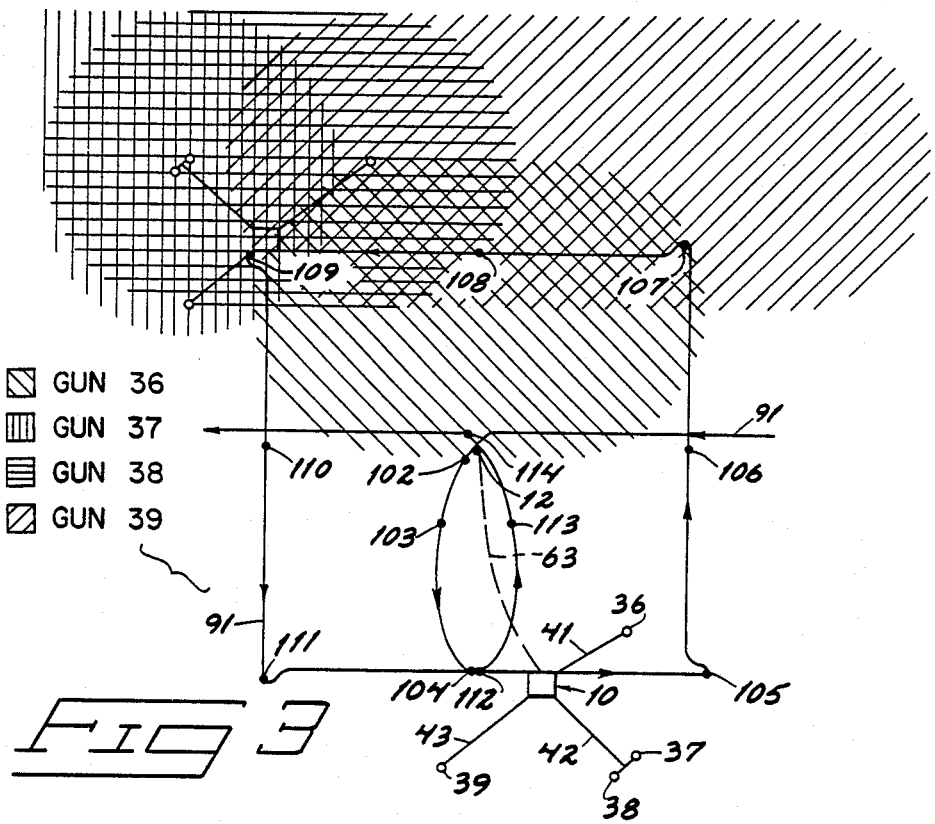
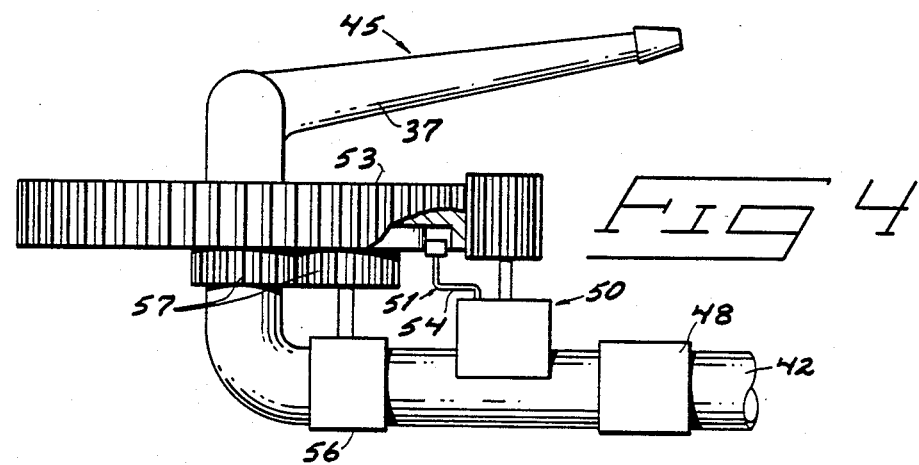
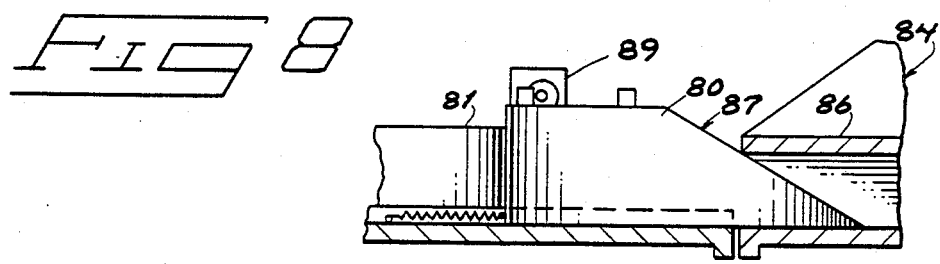

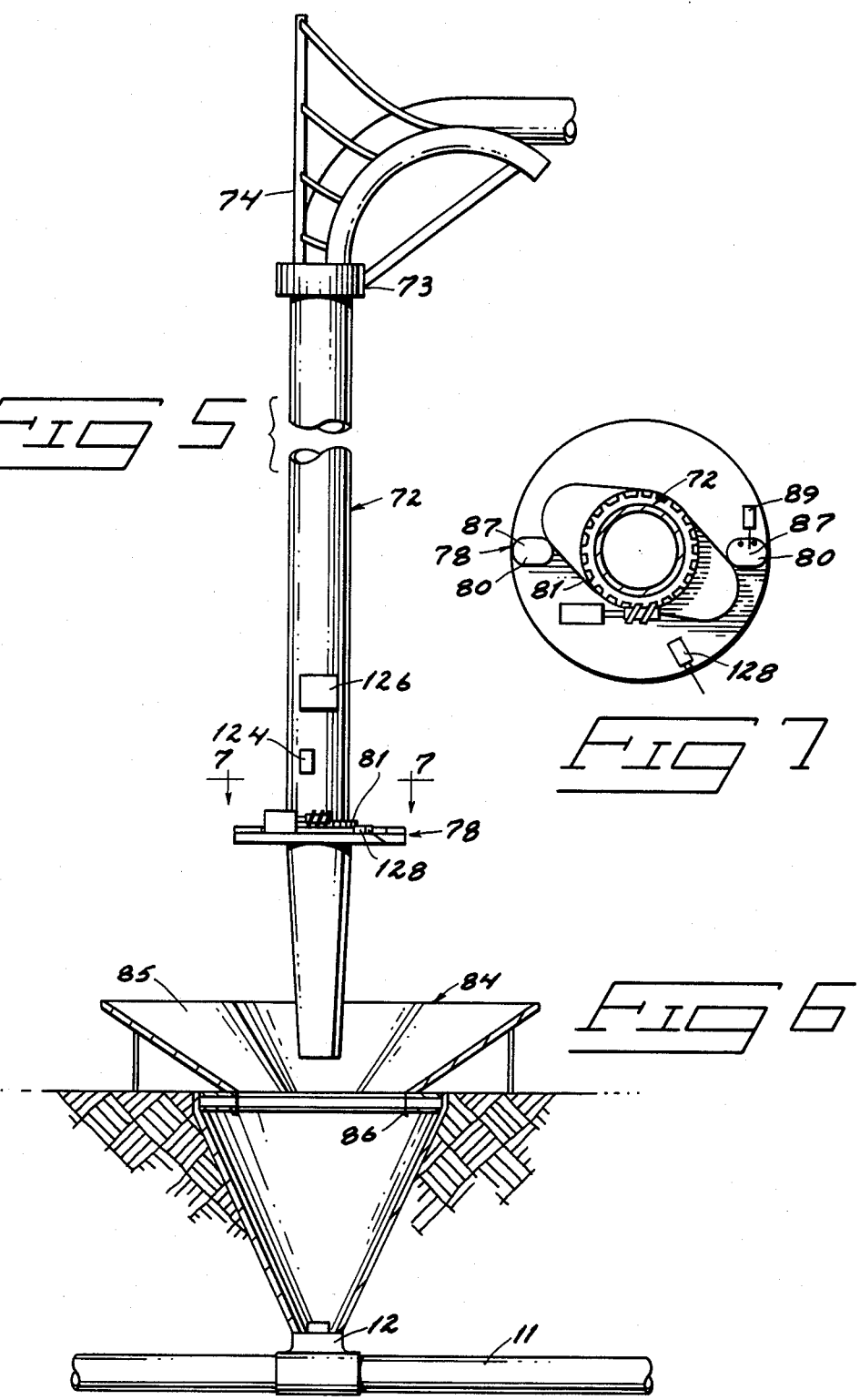

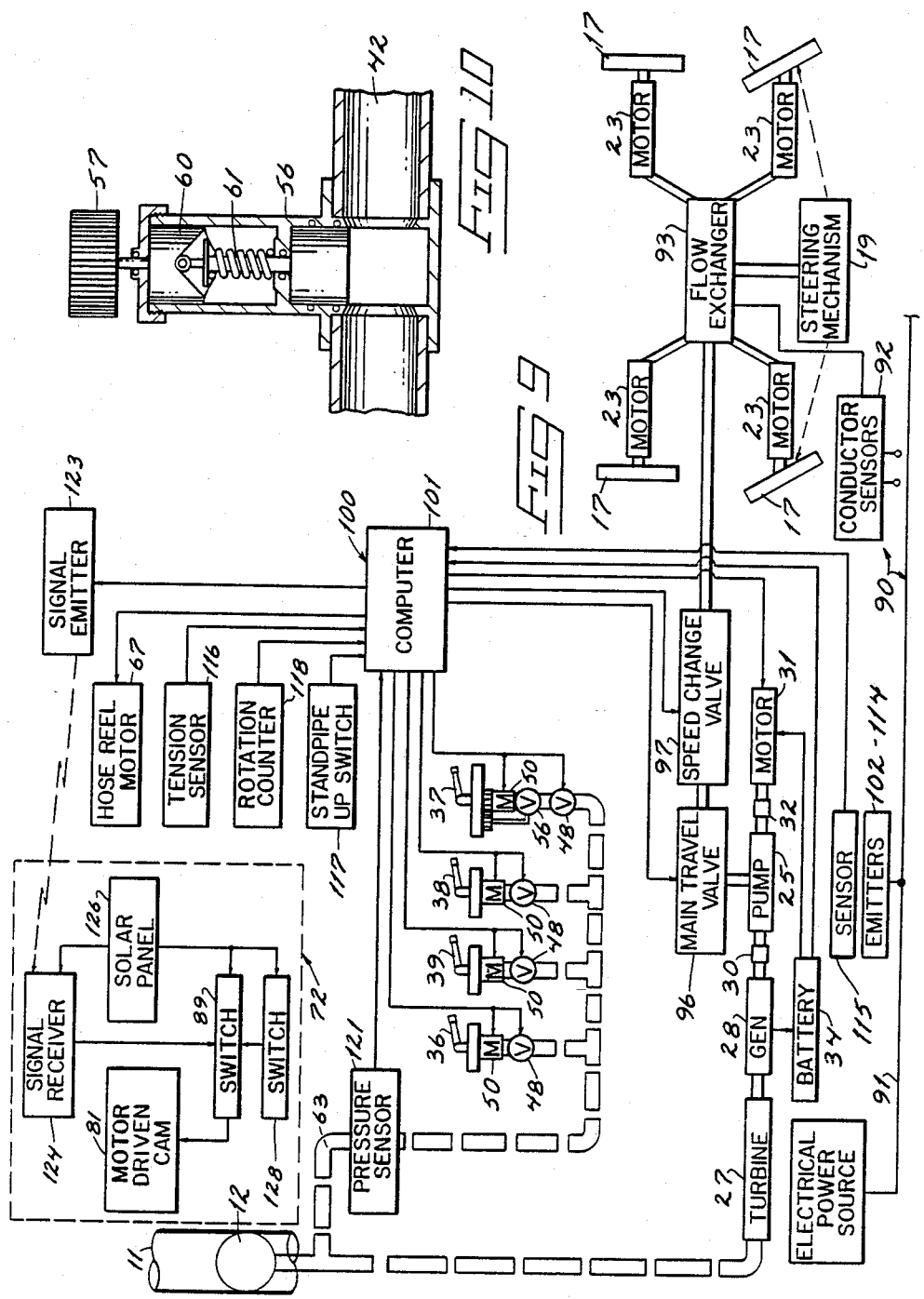

IRRIGATION SYSTEM

FIELD OF THE INVENTION

The present invention relates to irrigation by self moving irrigation devices.

BACKGROUND OF THE INVENTION

There are presently five basic systems used in large scale pressure irrigation. Selection of any one depends on the particular application requirements. Each approach incorporates its own characteristic advantages and disadvantages.

Probably the first large scale pressure irrigation technique involved the use of "hand lines". Hand lines are basically a series of water conduit sections capable of being coupled, uncoupled and hand moved from one setting to another. A common example of hand lines might be a 1,300 foot linear series of four inch conduit coupled in thirty foot lengths with riser pipes every sixty feet. Sprinklers attached to the riser pipes emit a spray of water over a radius of approximately forty feet. After a normal setting of eight to twelve hours, the entire series is hand moved approximately sixty feet and reset parallel to the previous conduit set.

Hand lines require a very large labor cost and suffer the associated inefficiencies. They also suffer from water and power waste created by sprinkler overlap and an inherent inability to interrelate with changing weather conditions due to a minimum inevitable ten or eleven day lapse between waterings. In addition, the lapse creates a continual fear of unexpected hot weather which causes constant overwatering.

Subsequent development of more automated systems has resulted in less frequent use of hand lines. However, for lands with very irregular shapes or extremely hilly contours, hand lines are often still used.

A subsequent development to hand lines has been the "wheel line" system. Wheel line systems involve sections of water conduit coupled together and acting as an axis for appropriately spaced powered wheels. The line is rolled to the next setting position after the system is drained and is reconnected to a main line water source.

Basically, a wheel line is a rolling hand line. It eliminates part of the labor expense relating to uncoupling, moving, and recoupling the hand line sections but retains much of the hand line inefficiencies, including water and power waste created by the necessary sprinkler overlaps, inflexible watering cycles and constant overwatering.

While capable of irrigating slightly hilly lands, wheel lines lose the ability of hand lines to irrigate hilly lands and to accommodate irregularly shaped land parcels.

A typical wheel line irrigates at least thirty-five acres, thus allowing large irregular fields to be irrigated by several wheel lines. However, the shape of the area irrigated is substantially limited to rectangular configurations.

Another more recent development in irrigation is the "lateral move" system. Lateral move systems consist basically of conduit sections trussed and mounted atop appropriately spaced wheeled towers. The towers and trusses along with much electronic and mechanical hardware, allow lateral move systems to continuously move across a field while full of water and in operation.

At present there are three methods commercially used for connecting lateral moves to a main water supply. One method uses a very large pump system usually located in the center or at one end of the conduit span designed to pump from a trough or ditch. Accordingly, this method is useful only for flat land.

The second method uses a hose connected to a pressurized main line. As the system moves, the hose drags along the ground until all slack is gone. It then becomes necessary to disconnect and move the hose to the next main line valve. The hose creates additional water resistance and thus requires higher operating pressure. However, this method of connection to the water source represents a relatively simple, inexpensive mechanical connecting apparatus, so initial start-up costs are minimized. The hose hookup system thus offers a relatively cost-effective method for smaller scale applications. Hose hookups allow use of the lateral move on slightly hilly land.

A third style of hookup for lateral moves is comparatively complex. Electronic and mechanical hardware allow automatic hookup and unhooking to a pressurized main line while the sprinkler line moves constantly forward with no shutdown of water flow. The approach eliminates manual hookups. It also allows the system to accommodate slightly hilly contours and alleviates many of the problems associated with pumping from a trough. However, initial equipment costs and malfunction potential are the highest of the three methods.

Lateral move systems represent an advance in technology. Forward sprinkler motion reduces the sprinkler overlap inefficiency, water cycle inflexibilities, and labor costs of the wheel line systems. Before the advent of the present invention, lateral move systems have been perhaps among the most efficient systems available. The overall cost for such a system, however, limits the effective use only to large scale farming. Typically, one lateral move will irrigate one or two square 320 acre sections. Lateral moves with hose hookups effectively accommodate somewhat smaller sections with increased inefficiencies.

Another significant advancement has developed in "center pivot" irrigators. Basically, a center pivot is a lateral move attached at one end to a stationary pivot. This causes the unit to revolve about the pivot, which also functions as a connection to the water supply. This eliminates nearly all of the lateral move water hookup technology and thus results in a simpler, less expensive machine. However, with the change in travel direction from linear to rotational, comes a completely different set of difficulties.

In relation to lateral moves, spray pattern efficiencies of center pivots are hampered and pressure losses are increased because of the need to linearly increase water output in proportion to the sprinkler distance from the pivot. The linear change in output also produces very high instantaneous application rates approaching the outer end of the water conduit. This can create runoff problems for long conduit spans in tight soil situations.

Center pivots must also employ some systems to apply water at corners of a section missed by its circular orbit. This additional and usually complex equipment adds considerably to the original equipment cost and complexity. The cost generally increases with the more corner land accommodated. Corner accommodation systems for center pivots represent comparatively larger additional water and power wastes. Disregarding corner systems, the cost per acre for center pivot irrigation is a function of the radius covered. The larger the span length (radius), the lower the cost per acre. A center pivot may effectively accommodate a 160 acre section. For larger sections, the cost per acre decreases but the instantaneous application rate increases.

For supplemental irrigation applications, some systems include rotatable wheel carriages. The wheel carriage may be rotated 90° to facilitate tractor transport. Thus, a single line can be transported from one center connection to another. This approach is limited to large acreage multiples, incurs additional buried main line expense, and suffers from labor inefficiencies. Also, with this approach, it becomes very difficult to use a corner system. Thus, between 15% to 23% of the land remains unwatered.

The fifth of the five forms of large scale pressure irrigation systems is the "reel" irrigator. A reel irrigation system incorporates a flexible hose combined with a hose reel. One hose end is connected to the water source and the other to a reel on a small cart carrying a high volume "big gun" type sprinkler. Alternatively, the reel is held stationary and only the sprinkler is mounted to the cart. A tractor tows the cart to the end of the field or until the reel is empty. A motor on the hose reel then slowly reels in the hose and cart as the sprinkler is operated. The cart may be pivoted about the water source and then towed again out to the end of the hose length. The cart motor can then be reactivated and the sprinkler operated as the cart moves back to the water supply connection. The tractor is then used to tow the reel to another spot for subsequent hookup and operation.

Pressure losses from the extreme length of hose and the necessary hose diameter along with the operating pressure necessary for high volume big gun sprinklers result in very high operating pressures and consequent high energy usage. Sprinkler travel geometry of a reel irrigator creates an inevitable large fluctuation in application amounts resulting in large water and power waste.

Reel irrigators, however, enjoy a degree of success on hilly and irregular shaped lands. It is in these areas where they outperform the other four irrigation systems and are often used. Otherwise, the high operating pressures, large water and power wastes, along with labor cost and associated inefficiencies render them cost ineffective.

The reel pays out the hose onto the ground surface as the cart is moved to the limit of the hose length. Thus, to avoid the hose dragging over and damaging the crop, the cart must be kept in line with the hose. This severely limits use of the otherwise independently movable cart to a "yo yo" motion.

A need remains for an irrigation system that effectively combines advantages of several individual systems listed above while minimizing the disadvantages.

BRIEF DESCRIPTION OF THE DRAWINGS

A preferred form of the present invention is illustrated in the accompanying drawings in which:

FIG. 1 is a plan view of a cart frame including features of the present system;

FIG. 2 is an elevational view thereof;

FIG. 3 is a diagrammatic view showing the typical path for the cart frame around a water main and access valve, along with a diagram showing a part of the sprinkler pattern for the present system;

FIG. 4 is an enlarged fragmentary detail view showing a sprinkler head and associated drive mechanism;

FIG. 5 is an enlarged detail view of a standpipe and associated mechanism for the present system;

FIG. 6 is a partial detail view of an anchor mechanism for the standpipe;

FIG. 7 is a sectional view taken on line 7—7 in FIG. 5;

FIG. 8 is an enlarged fragmentary view of the union of the standpipe and an anchor mechanism;

FIG. 9 is a control diagram of various components for the present system; and

FIG. 10 is an enlarged sectional view of a flow control valve shown in FIG. 4.

DETAILED DESCRIPTION OF A PREFERRED EMBODIMENT

The present invention involves an automated irrigating system by which cart mounted sprinkler guns are moved automatically about pre-selected circuits. The cart carried sprinklers are moved automatically from one access valve 12 to another located along a central water main 11. A specified circuit is completed by the cart-mounted sprinklers about each access valve 12 in order to irrigate a prescribed area of land. A succession of circuits about the individual access valves 12 may be shaped to conform to an extremely wide variety of land shapes or sizes.

The present system makes use of a self-propelled cart 10, carrying sprinkler guns selectively connected to the successive access valves 12 by a standpipe mechanism and a retractable hose. The standpipe is carried by the cart between successive access valves 12. The standpipe is automatically released from the cart and connected to each access valve 12 to become a rigid upright support for one hose end while the cart is moved about the successive circuits in relation to the connection at valve 12. After each circuit is completed, the standpipe is released from connection with the associated valve 12 and is carried along by the cart to the next successive access valve 12.

The self-propelled cart 10 is powered indirectly by pressure from the water main 11 to move about successive circuits, one of which is shown by FIG. 3. Flow of pressurized water is converted to electrical and hydraulic energy that is used indirectly by the cart to move itself along while irrigating the specified area around successive access valves 12. Electrical energy is also stored while the cart irrigates, for use later when the cart 10 has disconnected from the present access valve 12 to power its travel to a successive connection with an access valve 12 along the water main.

Various functions are performed by the cart and sprinkler guns as they move about the prescribed circuits in order to evenly and effectively distribute water in pre-selected patterns over the ground about the circuits travelled by the cart.

STRUCTURE

FIGS. 1 and 2 show details of a cart frame 15 supporting various elements of the present system for movement over the ground surface 16. The cart frame 15 is preferably constructed of strong, yet light-weight materials, for example, as shown by FIGS. 1 and 2 in a trussed configuration.

The cart frame 15 is movably supported by ground engaging wheels 17. Preferably, four wheels 17 are provided, one at each corner of the frame. The wheels 17 are rotatably mounted to the cart with a front set of wheels 17 mounted by steering mechanisms 19 and a rear set of wheels 17 rotatably mounted directly to the cart frame for rotation about fixed axes.

Wheels 17 are each powered to move the cart 10 along through a drive means shown generally at 21. Drive means 21 includes hydraulic motors 23 operatively connected between the cart frame and individual wheels 17. Motors 23 receive pressurized hydraulic fluid from a pump 25 on the frame. Pump 25 is driven by a water turbine 27 through a generator 28 and one-way clutch 30. The water turbine 27 is operated by flowing water from the water main 11. Alternatively, the pump 25 is driven by an electric motor 31 via a one-way clutch 32. The motor 31 is selectively powered by batteries 34. The generator 28, turned by turbine 27, is used to charge the batteries 34.

A number of sprinkler guns 36 through 39 are carried on the cart frame by elongated sprinkler booms 41 through 43. Sprinkler guns 36–39 are components of a water applicator means 45 for applying water in select and variable patterns over the ground surface as the cart 10 completes a circuit about an access valve 12. The booms 41 through 43 may extend substantially radially or diagonally from the cart frame 15 to remote ends that mount the sprinkler guns and are suspended above the ground surface 16 by an appropriate network of guy wires 46 partially shown in FIG. 2. Alternatively, the boom ends may be supported directly from elongated extensions (not shown) of the frame 15.

Boom 41 extends forwardly of the cart frame 15 and to one side thereof. Boom 42 also extends forwardly of the cart frame but to an opposite side. Boom 43 extends rearwardly and to the same side as boom 42. Sprinkler gun 36 is mounted at the remote end of boom 41. Sprinkler gun 37 is mounted to boom 42, along with a second sprinkler 38. A sprinkler gun 39 is mounted to boom 43, substantially in longitudinal alignment with sprinkler 38. The sprinkler guns 36 through 39 are spaced from the cart frame 15 and from each other according to their spray radii for maximum effective coverage of the area to be irrigated.

Each sprinkler is individually valved by an appropriate conventional electrically operable on-off valve 48 (FIGS. 1 and 4). Also, each sprinkler is rotated by a variable speed electric motor drive assembly 50. The rate of rotation for each sprinkler gun is controlled by selective operation of its variable speed drive motor assembly 50.

A rotational speed control means 51 is provided for each sprinkler gun to individually vary the rotational speeds of the gun. Means 51 includes individual cams 53 mounted to the rotatable sprinkler guns for rotation therewith. The cams 53 rotate with the guns and operate against follower arms 54 that are operatively connected to the variable speed motor drive assemblies 50 such that movement of the follower arms 54 will effectively vary the rotational speed of the variable speed drive motor assemblies 50. Specific cam shapes may vary with desired spray pattern requirements to avoid over-saturation of areas where sprinkler spray patterns overlap one another. The cams 53 will cause motor assemblies 50 to speed rotation of the sprinkler guns as they rotate into overlapping spray pattern areas, and slow rotational speed in areas where there is no overlap of spray patterns.

Sprinkler gun 37 is provided in conjunction with adjacent sprinkler gun 38 for corner watering requirements. Sprinkler gun 37, operating alone, utilizes the pressure and flow rate available for two sprinklers and consequently has a longer throw capacity. Sprinkler gun 37 is also provided with a flow control valve 56, operable by gearing 57 from the sprinkler gun 37 to cyclically vary the water throw distance. The shape of the spray pattern produced by sprinkler gun 37 is therefore varied according to the angular position of the sprinkler gun in relation to the cart 10. A spray pattern shape is indicated diagrammatically in FIG. 3.

A representative flow control valve 56 is shown in detail by FIG. 10. It includes a cam 60 that is turned by gearing 57 to move a spring biased plunger 61 across the water flow through boom 42. Selection of a shape for cam 60 depends on the corner configurations of the selected area to be irrigated. Generally, the cam shape may be made to conform to the desired corner spray pattern, which in most situations will be a substantially square corner configuration. As the cam 60 rotates, the plunger 61 will be forced up and down, causing the valve 56 to responsively open and close and thereby vary the throw distance.

The booms 41 through 43 and sprinkler guns 36 through 39 receive water under pressure through an elongated flexible hose 63. The hose 63 is formed of a flexible material of relatively high longitudinal strength so it may be suspended between ends over the ground surface while full of water.

An inside end of the hose 63 is indirectly connected to the sprinkler booms 41 through 43 and turbine 27 on the cart frame. This connection is diagrammatically shown in FIG. 9. The remaining length of hose 63 is coiled on a hose reel 65 to be selectively taken up or paid out by operation of a reversible hose reel motor 67. The reel 65 and motor 67 are mounted to cart frame 15 opposite booms 42 and 43 and substantially centered longitudinally between the wheels 17.

The remaining outer end of hose 63 is trained over a boom 68 and hose guide wheel 70 on the cart frame 15. The guide wheel 70 is freely rotatable on the boom 68 to allow the hose to be let out and taken up on reel 65. Boom 68 and guide wheel 70 position the hose 63 high above the ground surface to assist in suspending the hose 63 above the ground surface when in operation.

The boom 68 and hose guide wheel 70 also function, along with the reel 65 and reversible reel motor 67, as means on the cart frame for releasably supporting a rigid upright standpipe 72 connected to the outer hose end.

Standpipe 72 is a rigid elongated tube nearly the height of the hose guide wheel 70 above the ground surface. An upper end of the standpipe 72 is mounted through a swivel connection 73 to the outer hose end. A hose saddle 74 is mounted to the swivel 73 and partially encloses the hose 63. The hose saddle 74 properly guides the flexible hose 63 at the top end of the standpipe 72 and shapes the hose 63 at the connection with standpipe 72 during operation when the hose 63 is under tension to prevent collapse of its cross-sectional diameter.

A bottom, open end of the standpipe 72 is provided with a latching and valve actuating means 78 for securing the standpipe in a rigid upright position at a selected access valve 12 and for selectively opening and closing the valve 12. Means 78 includes a pair of wedge latch members 80 (FIGS. 5–8) on the standpipe that move substantially radially in and outward on the standpipe. An electric motor driven cam mechanism 81 is mounted to the standpipe and operatively engages the wedge latch members 80 to extend and retract.

Each of the access valves 12 along the water main 11 is provided with a standpipe guide means 84 (FIG. 6) for guiding the standpipe to be releasably connected to the access valves 12. The guide means 84 each includes a guide 85 of a funnel configuration that converges downwardly to the associated access valve 12. A clamp ring 86 is fixed to guide 85 upwardly from the valve 12 to co-act with the wedge latch members 80 on the standpipe.

Wedge surfaces 87 on the wedge latch members, when moved outwardly, may be received by the clamp ring 86 as shown in FIG. 8. The wedge surfaces 87 act against the clamp ring 86 to force the bottom standpipe end down against the valve 12, causing it to open.

The latching and valve actuating means 78, along with guide means 84 and clamp ring 86 operate as an anchor or attachment means for releasably securing the standpipe in a stationary, rigid upright position. These elements are also operable to open the access valve 12 and allow waterflow through the standpipe to the hose and, ultimately, to the sprinkler guns 36–39 and turbine 27.

When the standpipe 72 is rigidly mounted to the ground, its top end extends high above the ground to suspend the outer hose end. The inner hose end on the cart frame is suspended by the boom 68 and hose guide wheel 70. The standpipe 72, hose guide wheel 70, hose reel 65 and reel motor 67, thus function as means for elevating and tensioning the hose length above the ground surface during operation of the present system, and for taking in and letting out the hose while maintaining its elevation above the ground surface.

CONTROLS

The cart 10 of the present system is controlled to move along the ground while performing various functions automatically by provision of the controls and related components described generally below. It is noted that many of these components and connections, whether electrical, hydraulic, or mechanical, are standard commercially available items. Therefore, they are shown in general form only and will not be discussed in great detail. FIG. 9 diagrammatically shows the control components and their general relationship with the structural components of the present system.

Actual movement of the cart frame over the ground surface is controlled by a drive control means shown generally at 90. Control means 90 is associated with the drive means 21 for guiding the cart along a predetermined path determined by a buried electrical conductor 91 as indicated in FIG. 3. The drive control means 90 may include an electrical conductor 91 buried beneath the ground surface 16 and arranged in relation to the individual water access valves 12 to define specific paths for the cart 10. Field strength of the conductor 91 is sensed by steering actuator means including conductor sensors 92 on the cart frame.

The sensors 92 are connected through a flow exchanger valve 93 and steering mechanisms 19 respectively to the wheel drive motors 23 and front wheels 17. The flow exchanger valve 93 in the hydraulic line from pump 25 to motors 23 is operable by the sensors 92 to change rotational speeds of the wheel drive motors 23 on opposite sides of the cart to thereby change direction of the cart 10. Front wheel steering mechanisms 19 are also operable in response to sensors 92 to assist flow exchanger valve 93 to keep the cart on the prescribed path.

An electrically operated main travel hydraulic valve 96 and a speed change valve 97 are provided in the hydraulic circuit between pump 25 and wheel drive motors 23. Main travel valve 96 is basically an "on-off" valve in the hydraulic line to the motors 23 for starting and stopping motion of the carriage. The speed change valve 97 is in the same line and is operable to control speed of the cart 10 over the ground surface, and is manually programmable to change the cart speed and thus water application amount.

Valves 96 and 97 are electrically operated automatically, along with other control mechanisms on the cart frame 15 in response to a function control means 100 that is diagrammatically illustrated in FIG. 9. More specifically, the function control means 100 is provided to operatively connect the drive means 21, water applicator means 45, and the standpipe anchor and attachment means, for automatically activating and de-activating these various components at selected stations for selected periods of time along the path of the cart 10.

The function control means includes an actuator means in the form of onboard computer 101 situated on the cart frame 15. Computer 101 is programmed to activate, de-activate and time individual operations of the present system. The computer 101 may be comprised of commercially available components arranged to interpret various signal impulses and, in response, initiate or stop operation of various electrical controlled components over selected timed sequences.

Electrical connections between the computer 101 and associated components are shown diagrammatically in FIG. 9. The computer 101 receives power from the batteries 34. It also operates to supply electrical current from the batteries 34 to various electrically operated components in response to the various signals received.

Signals are received by computer 101 from various signal emitters 102 through 114 (FIGS. 9 and 3) connected to the buried electrical conductor 91 and spaced at strategic locations along the path of the cart. Signals from the emitters 102 through 114 are received by a sensor 115 at the forward end of the cart frame. The sensor 115 transmits received signals to the computer 101. Typically all emitters are identical and the computer counts then from 1 to 13 around the prescribed circuit shown in FIG. 3. Each signal emitter will initiate a prescribed activity.

The computer 101 also receives input signals from a tension sensor 116, an end of hose feeler switch 117, and a rotation counter 118 on the frame adjacent hose reel 65 (FIG. 9). Specific signals are also received from a water pressure sensor 121 on the cart frame and in the flow path of water through the hose 63.

The computer 101 operates a signal emitter 123 on the cart frame to produce a signal received by a signal receiver 124 on the standpipe. The signal receiver 124 is electrically connected to the motor driven cam 81 and a solar panel and battery assembly 126 on standpipe 72. The solar panel assembly 126 is electrically connected to the motor driven cam 81 through the signal receiver 124 and a feeler switch 128. The standpipe mounted switch 128 is positioned adjacent to the latch members 80 on the standpipe 72 to be operated by engagement with the clamp ring 86 on standpipe guide 85.

The computer 101 is also electrically connected to the hose reel motor 67. The motor 67 is operated in response to various signals received by the computer 101 to start or stop hose reel rotation in forward or reverse directions. The hose 63 is thus taken up or let out on demand from the computer 101.

The main travel hydraulic valve 96 and speed change valve 97 are electrically connected to the computer 101 for operation to control flow of hydraulic fluid from pump 25. The electric motor 31 is also controlled through the computer 101 to drive the pump 25.

Computer 101 is also electrically connected to the individual sprinkler gun drive motor assemblies 50 and valves 48 to activate the various motors and valves at specified locations along the cart circuit.

Specific functions and the sequence of events initiated through the control system described above will be more fully understood from the operational description given below.

OPERATION

Operation of the present invention is best described as the cart 10 approaches an access valve 12 and then travels in one complete typical orbit around the associated access valve 12. The various signal emitter positions and path defined by the buried electrical conductor 91 are shown in FIG. 3.

Also, spray patterns of the sprinkler guns are shown along one side of the path in FIG. 3. Only one side of the total pattern is shown to avoid confusion. The remaining sides of the substantially rectangular path will have patterns identical to the pattern shown.

It is noted that the prescribed path formed by conductor 91 need not be rectangular. It is preferred, however, that the path be shaped in a closed loop about the access valve 12. The shape of the loop may vary with the shape of the parcel to be irrigated.

The cart approaches the access valve 12 guided by the buried electrical conductor 91. As the cart moves along, the sensors 92 on the cart frame detect the field strength of the conductor 91 and, correspondingly, operate the flow exchanger 93 and steering mechanisms 19 to appropriately maintain the cart 10 along the desired path.

Power is supplied, traveling between access valves, by the batteries 34 and the hydraulic pump 25 is operated by the electric motor 31. The cart frame thus moves along, self-propelled, carrying the standpipe substantially as shown in FIG. 2 toward the access valve 12.

As the cart approaches access valve 12, the computer 101 receives a signal from the first emitter 102 via signal emitter sensor 115. In response, the computer 101 actuates the main travel hydraulic valve 96, causing it to close. The wheel motors 23 then stop forward motion and the cart halts its forward motion directly adjacent the access valve 12 and with the standpipe 72 suspended directly over the standpipe guide 85.

The computer 101 also activates the hose reel motor 67 in response to the signal from emitter 102 to let out hose 63 and thereby lower the standpipe 72 toward the access valve 12 from its suspended position on the cart frame. The standpipe bottom end will be guided into position over the access valve as it is lowered. The feeler switch 128, positioned along the standpipe 72, will engage the clamp ring 86 as the standpipe continues downwardly. The feeler switch 128 actuates the latching and valve actuating means 78 by switching power from the solar panel assembly 126 to the motor driven cam 81. The motor driven cam 81 then rotates to force the wedge latch members 80 outwardly against the clamp ring 86. The wedged surfaces 87 act against the stationary clamp ring 86 to force the standpipe downwardly, securing the standpipe in position and pressing the bottom standpipe end against the access valve 12 to open the valve and allow water flow into the standpipe from the water main 11. A double acting trip switch 89 stops the motor driven cam when the wedges are fully engaged.

The water pressure sensor 121 immediately detects water pressure as the valve 12 is opened. In response, the sensor 121 signals the computer 101.

The computer 101 operates in response to the signal from water pressure sensor 121 to cause the main travel hydraulic valve 93 to be opened. The wheel drive motors 23 are thereby actuated and the cart 10 is allowed to move ahead in a forward direction, leaving the upright standpipe secured to the opened access valve 12.

Another function initiated by the computer 101 at this time is deactivation of the pump drive motor 31. This is made possible since water pressure from the water main 11 is not operating the turbine 27 to directly drive the pump 25 through the generator 28. The generator 28 may be used at this time to re-charge the batteries 34 in anticipation of later need when the cart 10 is disconnected from the water main 11 and must progress on to the next successive access valve.

Forward motion of the cart continues as guided by the buried conductor 91 away from the now fixed and stationary upright standpipe 72. Slack from the hose being paid out by the reverse rotation of the hose reel 63 through motor 67 is accommodated for by forward movement of the cart until the cart reaches the next successive emitter 103. Emitter 103 produces a signal through sensor 115 causing the computer 101 to activate the tension sensor 116. Tension from the suspended hose 63 between the rigid standpipe 72 and hose guide wheel 70 is detected by the tension sensor 115. This information, along with input from the hose reel rotation counter 118 is interpreted by the computer 101. The sensor 115, rotation counter 118 and computer 101 thus operate as a tension control means for controlling the hose reel motor 67 to keep the hose at an appropriate elevation from the ground surface. This function continues throughout the circuit as the cart moves about the prescribed path. The hose 63 will therefore remain clear of the crop and allow relatively free travel of the cart. Additionally, the amount of tension applied through the hose reel 63 and motor 67 is varied through the tension sensor by rotation counter 118. The rotation counter 118 functions to vary the tension limits of sensor 115 as the hose 63 is extended and retracted in relation to the cart frame. The varying hose tension is substantially counterbalanced by the weight of water and steel in the booms 42 and 43.

As the cart 10 continues to move along, the computer 101 will receive a signal through sensor 115 from the next successive signal emitter 104. In response to this signal, the sprinkler drive motor assembly 50 is activated and the associated valves 48 for sprinkler guns 39 and 38 are opened. These sprinklers then begin operation. The adjustable speed change hydraulic valve 97 is also operated at this point to reduce the speed of the cart to a pre-set slow speed setting for a desired water application rate. Sprinkler guns 39 and 38 remain opened as indicated in the pattern diagram of FIG. 3. It is again noted that though the diagram is shown for a single side of the overall pattern, each side of the overall circuit is identical.

As the cart continues along with the sprinklers 39 and 38 operating, the next successive emitter 105 is encountered near the first of the corners for the prescribed circuit. The sensor 115 receives the signal from emitter 105 and, in response, the computer 101 causes the main travel hydraulic valve 96 to be closed. The cart 10 then stops and remains stationary while the computer 101 initiates operation of sprinkler 37. Sprinkler 38 and 39 are turned off at this point.

Rotation of the sprinkler 37 is controlled through its own variable speed motor drive 50 and associated cam 53. The flow control valve 56 is operated automatically as sprinkler gun 37 is rotated to vary the operating pressure and the throw distance from the sprinkler. The resulting spray pattern is substantially identical to the pattern shown in the upper left hand corner of the circuit in FIG. 3. As shown, the throw distance from gun 37 is maximized approaching the actual corner of the area to be irrigated.

An appropriate timer within computer 101 may be linked through the speed change hydraulic valve 97 to time the watering duration of sprinkler 37. The speed change valve 97 is linked to the timer to prescribe an appropriate time setting so the application rate at the circuit corners will coincide with that of the remaining areas of the parcel.

When the time expires, computer 101 operates the sprinkler valve 48 to turn sprinkler 37 off. The travel hydraulic valve 96 is then opened and the cart resumes forward progress. The valves 48 associated with sprinklers 36 and 39 are simultaneously opened and the associated sprinklers begin operation. The cart 10 then continues forward progress until the next successive emitter 106 is encountered. At this point the signal from emitter 106 is received through the sensor 115 by computer 101 and, in response, the sprinkler 36 is turned off. Simultaneously, sprinkler 38 is started and begins rotation. Again, this action is indicated by the spray pattern illustrated in FIG. 3.

The remaining functions initiated by emitters 107 through 111 are substantially repetitions of the functions described above as the cart completes its orbit around the access valve 12. The spray indicated in FIG. 3 is therefore repeated on all four sides of the prescribed circuit.

It is noted, with exception of the single sprinkler 37 operating at the circuit corners, that two of the three remaining sprinklers are operated continuously as the cart 10 moves about the exterior perimeter of the circuit. This utilizes the maximum water flow rate while the water application rate is minimized to reduce run-off problems.

As the cart 10 approaches the end of its circuit about the access valve 12, emitter 112 is encountered. Signal from emitter 112 is received by the sensor 115 and transmitted to computer 101. In response, the computer 101 operates to turn all the sprinkler gun valves off and operates the speed change hydraulic valve 97 to a higher speed setting. The cart then progresses inwardly toward the access valve at maximum speed.

During this time, the hose reel motor 67 operates via tension sensor 115 and revolution counter 118 to take up the hose as the cart moves back toward the access valve 12. However, tension becomes reduced along the length of the hose 63 as the distance decreases between the cart 10 and valve 12. Therefore, an emitter 113 may be placed along the path back to the access valve 12 to produce a signal to computer 101 which, in turn, switches the hose reel motor 67 to retract at full speed. The hose slack is then taken up at a fixed rate as the cart returns to the access valve 12.

Upon reaching the access valve 12, the final emitter 114 is encountered. The resulting signal through sensor 115 to computer 101 is interpreted to cause the main hydraulic valve 96 to be closed so the cart will stop with the hose wheel 70 situated directly above the standpipe 72. The hose reel motor 67 is switched off at the point. The computer 101 also activates emitter 123 in response to the signal from the ground based emitter 114. Emitter 123 is situated on the cart frame to signal the receiver 124 on the standpipe 72. The receiver 124, in response, activates the motor operated cam 81 to rotate, withdrawing the wedge latch members 80 from engagement with the clamp ring 96. The retracting wedge members actuate the two-way trip switch 89 to deactivate the motor driven cam 81. The standpipe 72 is thereby allowed to move upwardly in response to water pressure through the access valve 12 until the access valve 12 closes.

The water pressure sensor 121 immediately detects the sudden drop in water pressure. In response, the hose reel motor 67 is actuated to lift the standpipe 72 upwardly over the ground surface to be suspended from the cart frame. The hose feeler switch 117 on the cart is then engaged by a point along the hose 63 as it is taken up on the reel 65. Switch 128 indicates to the computer 101 that the standpipe is clear of the ground. The hose reel motor 67 is then switched off and the main travel hydraulic valve 96 is opened to allow the cart to resume travel along the path to the next successive access valve 12.

The drop in water pressure also initiates the computer 101 to switch the driving mode from turbine 27 to the electric drive motor 31. The power for continued movement of the cart is therefore supplied through the now recharged batteries 34.

The above procedures are repeated as the cart encounters the next successive access valve and set of appropriately spaced signal emitters. This process continues for a series of access valves irrigating the area defined by the prescribed path set by the buried conductor 91.

The system described above, incorporating aerial hose suspension allows the mobile cart frame with the water applicator means to move about a single access valve 12 in any shape path as prescribed by the buried electrical conductor 91. In order to achieve this, the hose reel motor 67 appropriately reels the hose in or out while maintaining the hose length in its suspended orientation between the standpipe 72 and hose guide wheel 70 above the ground surface. There is no danger of the hose length dragging across the ground and damaging plants between the access valve 12 and cart frame 15.

As an example, the present system may be designed to accommodate 160 acres in sections as small as 10 acres each. The ability to irrigate a succession of small sections present a capacity for land shape flexibility superior to known present systems. The systematic use of the four sprinklers in conjunction with calculated variable sprinkler rotation speeds render the aerial hose system very efficient. Coverage efficiency and spray pattern efficiency may be compared with the extremely efficient lateral move systems. Thus, power and water waste is minimized. Further, the present system is totally automatic so there is no operating labor force required.

The present invention creates the ability to reduce the water throw distance, allowing the use of water diffusing nozzles that enable a much lower than normal operating pressure for midsized big gun sprinklers. The moderate operating pressure combines with a system pressure loss that is typically lower than any of the presently known systems. Thus, the present system displays an overall operating pressure or power usage that is comparable to wheel lines, low pressure center pivots, and low pressure lateral moves.

The capacity to irrigate very irregularly shaped parcels, power-water usage efficiencies of the coverage and spray pattern, absence of necessary operating labor and associated inefficiencies, low operating power usage, reliability and cost, all make the present system at least as effective and in many instances, more so than all other systems for application situations ideal for those particular systems.

For conditions most ideal to center pivots, spray pattern efficiency and ability to irrigate virtually all of the land makes the present system more effective. Furthermore, farm land is very seldom found in large square shapes ideal for center pivots. The present system is adaptable to nearly any regular or irregular shaped land parcel and, as such, clearly excells over center pivots and all other presently known systems in overall land coverage effectiveness.

A great need for a new irrigation approach for use in hilly lands is met by the present invention. The cart, moving independently while suspending the hose between the rigid standpipe 72 and hose guide wheel 70, facilitates operation over substantially hilly areas that were previously irrigated only by reel irrigators and hand lines. The present system thus alleviates the labor costs and power-water wastes associated with the typical hand line and reel irrigators, along with the high operating energy usage of reel irrigators.

In many cases, productivity of crops may be greatly advanced with the ability to supplement irrigation in times of drought, heavy water intake, and peak temperatures through operation of the present system. The present system includes features that enable it to irrigate any size field with precision so virtually no ground remains unwatered. Water and power wastes are kept to a minimum and no operating labor is required. As with any continuous move system, application rates may be set as small as 0.1 inches, allowing the water to be perfectly incorporated in the selected watering schedule. For supplemental irrigation needs, the present system represents a considerable conservation of power and water along with inevitable increases in productivity. These features make it the only viable system for most supplemental application situations.

In compliance with the statute, the invention has been described in language more or less specific as to structural features. It is to be understood, however, that the invention is not limited to the specific features shown, since the means and construction herein disclosed comprise a preferred form of putting the invention into effect. The invention is, therefore, claimed in any of its forms or modifications within the proper scope of the appended claims, appropriately interpreted in accordance with the doctrine of equivalents.

I claim:

1. An irrigation system, comprising:
   a water delivery pipe;
   cart means for movably supporting the water delivery pipe;
   drive means on the cart means for selectively moving the cart means and water delivery pipe;
   sprinkler guns spaced longitudinally along the water delivery pipe, rotatable thereon about axes for delivering water in overlapping spray patterns;
   selectively operable motor means for each gun for driving the sprinkler guns to rotate about the axes; and
   rotational speed control means connected with the motor means for selectively controlling the individual motor means to vary the rotational speed of each gun such that water application rates can be selectively varied about the overlapping spray patterns.

2. An irrigation system connectable to a water main, comprising:
   a cart frame
   ground engaging drive means on the cart frame for selectively moving the cart frame over the ground in prescribed circuitous paths from stations along the water main;
   water applicator means on the cart frame operable to apply water in a selected pattern over the ground surface as the cart frame is moved along, imperforate hose means having one end connected to the applicator means and a free end for connection to the water main at selected locations along the ground surface;
   control means associated with the drive means and water applicator means for selectively controlling motion of the cart frame and operation of the water applicator means such that the cart frame is moved in the prescribed circuitous paths about successive water main stations and the water applicator means is selectively operated to apply water over the ground surface along selected portions of the prescribed path; and
   wherein the water applicator means includes sprinkler booms on the cart frame extending to ends elevationally above the ground and remote from one another.

3. The irrigation system as claimed by claim 2 wherein at least two booms extend to ends on opposite sides of the prescribed path.

4. The irrigation system as claimed by claim 2 wherein the cart frame is powered by the drive means for movement in a forward direction and wherein three booms are mounted to the cart frame, with two of the booms each having an end extending forwardly with respect to the forward direction, and one of the booms having one end extending rearwardly.

5. The irrigation system as claimed by claim 4 wherein one of the forwardly extending boom's ends is in longitudinal alignment with the rearwardly extending boom end.

6. The irrigation system as claimed by claim 4 wherein the prescribed circuitous paths about successive water main locations are each in the shape of a closed loop and wherein one of the boom ends projects into the closed loop and the remaining boom ends project outside the closed loop.

7. An irrigation system connectable to a water main, comprising:
   a cart frame;
   ground engaging drive means on the cart frame for selectively moving the cart frame over the ground;
   drive control means associated with the drive means for guiding the cart frame along a predetermined path leading in prescribed circuits from stations along the water main;

water applicator means on the frame selectively operable for applying water over the ground surface as the cart frame is moved along;

an elongated imperforate flexible hose attached at one end to the water applicator means and extending to a remote end;

attachment means at the remote hose end for automatically connecting and disconnecting the remote hose end to and from the water main;

hose elevating means mounting the hose between its ends for continuously suspending the hose above the ground surface when the remote hose end is connected to the water main, and for paying out and taking up the hose in response to movement of the cart frame about the predetermined path; and function control means including signal emitters stationed along the predetermined path for automatically activating and deactivating the ground engaging drive means and attachment means at selected stations along the predetermined path set by the drive control means, and for controlling the applicator means to vary the spray pattern at selected positions of the cart frame along the predetermined path.

8. The irrigation system as claimed by claim 7 wherein the drive control means is comprised of:

an electrically conductive wire adapted to be positioned along the ground to define the predetermined path for the cart frame and steering actuator means on the cart frame operatively connected to the drive means, responsive to the conductor wire, for controlling the drive means to steer the cart frame about the predetermined path.

9. The irrigation system as claimed by claim 7 wherein the function control means is comprised of:

signal emitters adapted to be positioned along the predetermined path for emitting specific control signals;

function actuator means on the cart frame operatively connected to the drive control means, water applicator means, and attachment means responsive to the control signals from the signal emitters, for controlling (a) rate of travel of the cart frame about the predetermined path, (b) spray pattern from the water application means, and (c) connecting and disconnecting functions of the attachment means.

10. The irrigation system as claimed by claim 7 wherein the water applicator means includes a plurality of rotatry sprinkler guns on the cart and operably attached to the hose; and motor drive means attached to the individual sprinkler guns, for selectively rotating the sprinkler guns to achieve prescribed sprinkler patterns.

11. The irrigation system as claimed by claim 7 wherein the drive control means is arranged to guide the cart in the circuitous paths with the stations along the water main at the approximate centers thereof.

12. The irrigation system as claimed by claim 7 wherein the elevating means includes a rigid upright standpipe at the remote hose end, adapted to be connected to the water main; and a hose reel means mounting the hose to the cart to pay out and take up the hose; and tension control means associated with the hose reel for controlling the hose tensioning reel to maintain the hose in a taut condition between the standpipe and cart frame and elevated by a prescribed distance above the ground surface between the standpipe and cart frame.

13. The irrigation system as claimed by claim 12, wherein the elevating means is further comprised of:

means on the cart frame for releasably supporting the standpipe on the cart frame for transport, wherein the water applicator means includes a sprinkler boom on the cart frame extending to an end elevationally above the ground.

14. The irrigation system as claimed by claim 7 wherein the water applicator means includes rotary sprinkler guns; and elongated water delivery booms projecting outwardly of the cart frame to mount the sprinkler guns at ends thereof remote from the cart frame.

15. The irrigation system as claimed by claim 14 wherein the water applicator means is further comprised of motor drive means attached to the sprinkler guns and function control means for selectively activating the sprinkler guns.

16. The irrigation system as claimed by claim 15 wherein the motor drive means includes a rotational speed control means operatively connecting the motor drive means and sprinkler guns for controlling rotational speed of the sprinkler guns.

17. An irrigation system connectable to a water main having spaced access valves, comprising:

a cart frame;

ground-engaging drive means on the cart frame for selectively moving the cart frame over the ground;

a rigid upright standpipe carried by the cart frame, having a top end and a bottom end, the bottom end being releasably connectable to the water main at one of the access valves thereon;

anchor means on the upright standpipe selectively operable to secure the standpipe in a stationery upright position over a selected access valve of the water main with the top end spaced elevationally above the ground surface;

an elongated imperforate flexible hose having one end connected to the upright standpipe at the standpipe top end, and extending to a remaining end;

sprinkler means on the cart frame connected to the remaining hose end;

a motor driven hose reel on the cart frame for storing the hose and for paying out and taking up the imperforate hose between the cart frame and standpipe when the standpipe is secured by the anchor means, and for maintaining the imperforate hose elevationally above the ground surface;

control means for selectively operating the drive means to move the cart in a prescribed path to a succession of the water main access valves; and function control means operatively connected with the anchor means and drive means, for selectively actuating the anchor means to secure and release the standpipe over selected access valves in response to positioning of the cart frame adjacent the access valve.

18. The irrigation system as claimed by claim 17 further comprising means for suspending the standpipe from the cart when the cart is in transit from one access valve to another.

19. The irrigation system as claimed by claim 17 further comprising a swivel mounting the one hose end to the standpipe at the top end thereof.

20. The irrigation system as claimed by claim 17 wherein the anchor means includes:
   a ground mounted standpipe guide means mountable adjacent to each access valve, for receiving and guiding the bottom standpipe toward the access valve.

21. The irrigation system as claimed by claim 20 wherein the anchor means is further comprised of latching and valve actuating means on the standpipe at the bottom end thereof for selectively locking the standpipe to the standpipe guide means and for selectively opening the associated access valve.

* * * * *